Dec. 18, 1962
A. STIHL ETAL
3,068,961
AUTOMATICALLY OPERABLE LUBRICATING PUMP, ESPECIALLY
FOR MOTOR CHAIN SAWS
Filed Sept. 18, 1959
5 Sheets-Sheet 1
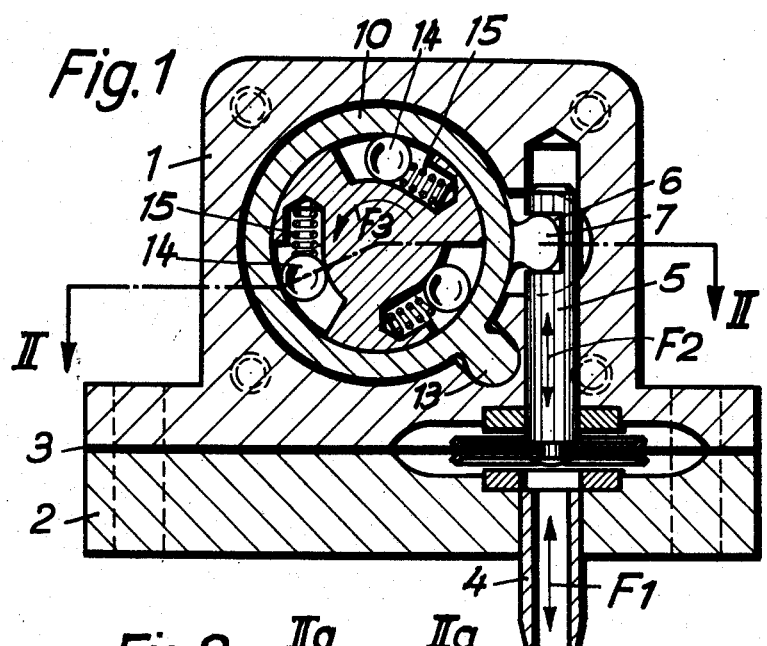
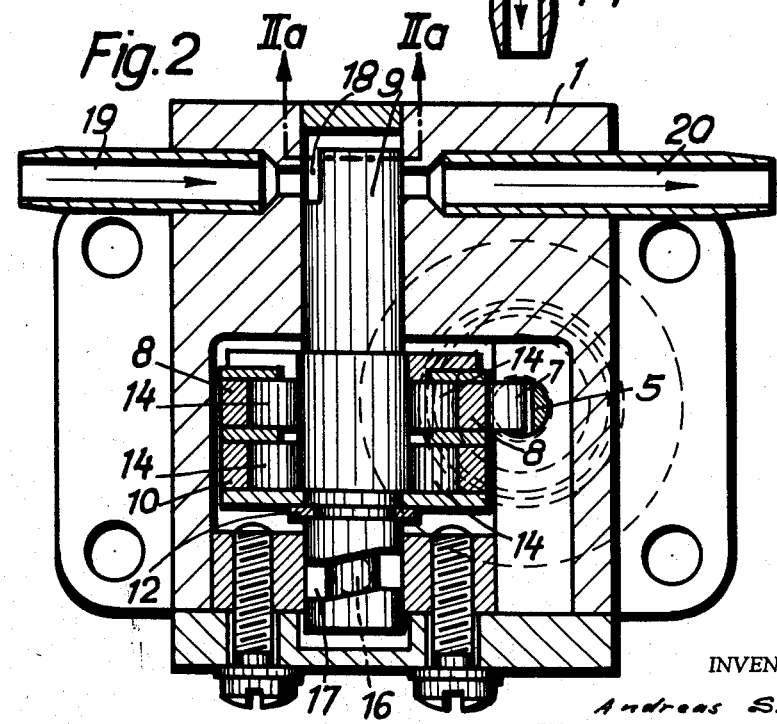
INVENTOR.
Andreas Stihl
BY
Patent Agent Dec. 18, 1962  A. STIHL ET AL  3,068,961
AUTOMATICALLY OPERABLE LUBRICATING PUMP, ESPECIALLY
FOR MOTOR CHAIN SAWS
Filed Sept. 18, 1959  5 Sheets-Sheet 2
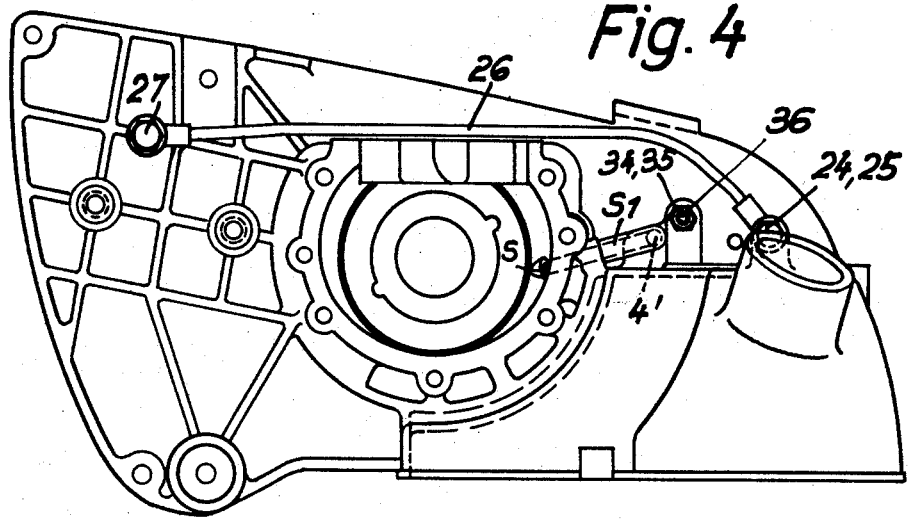
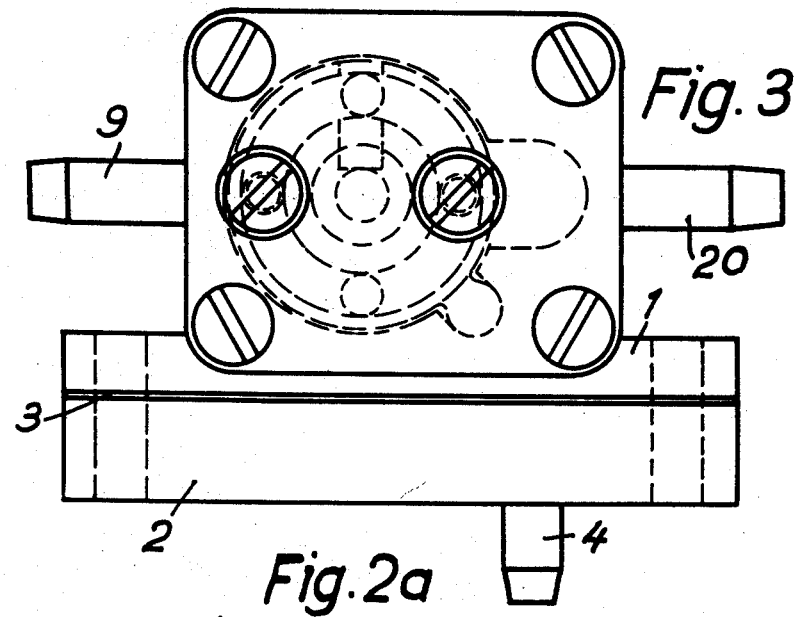
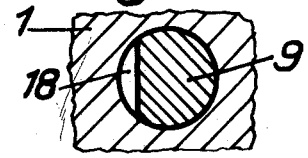
INVENTOR.
Andreas Stihl
BY
Patent Agent

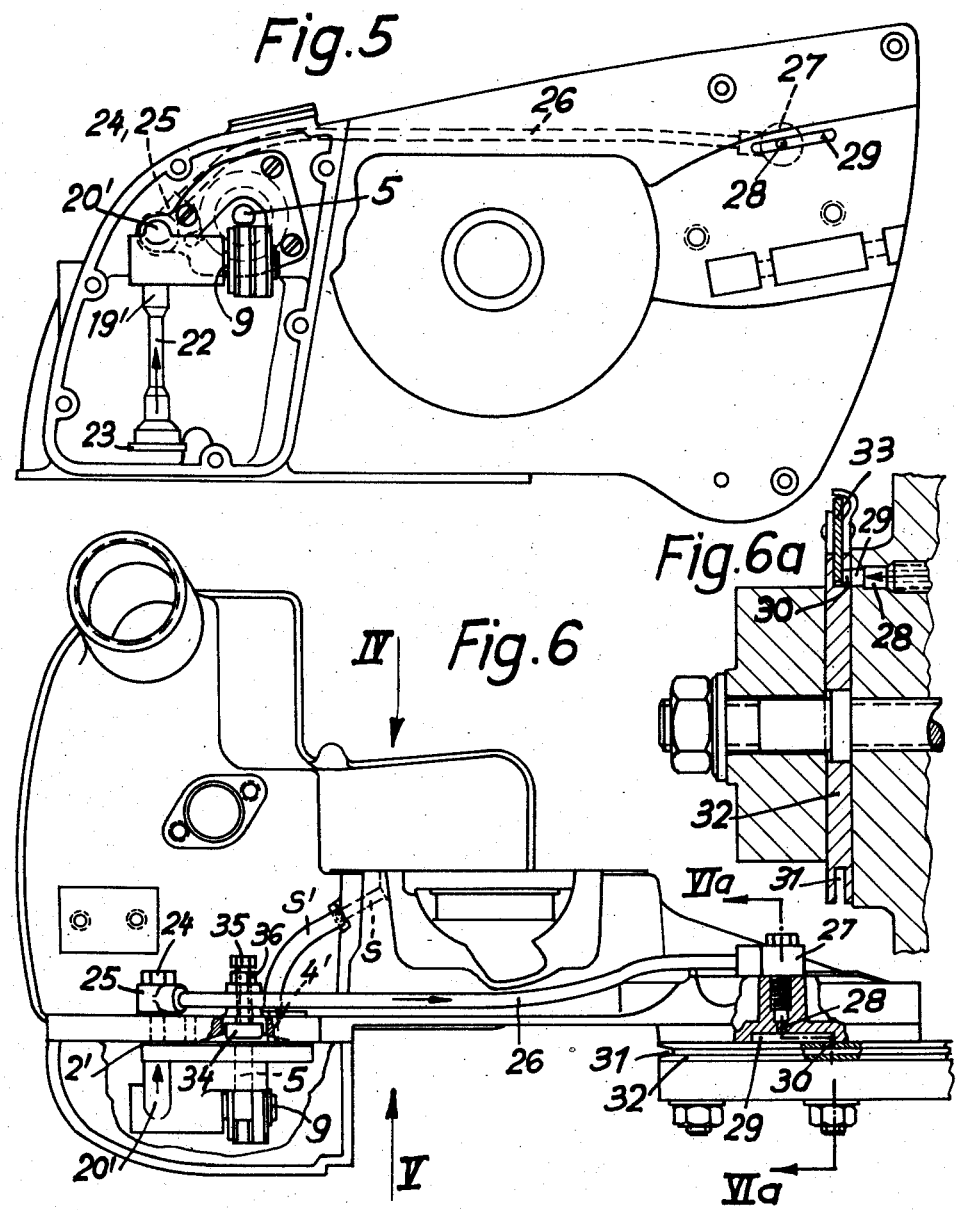

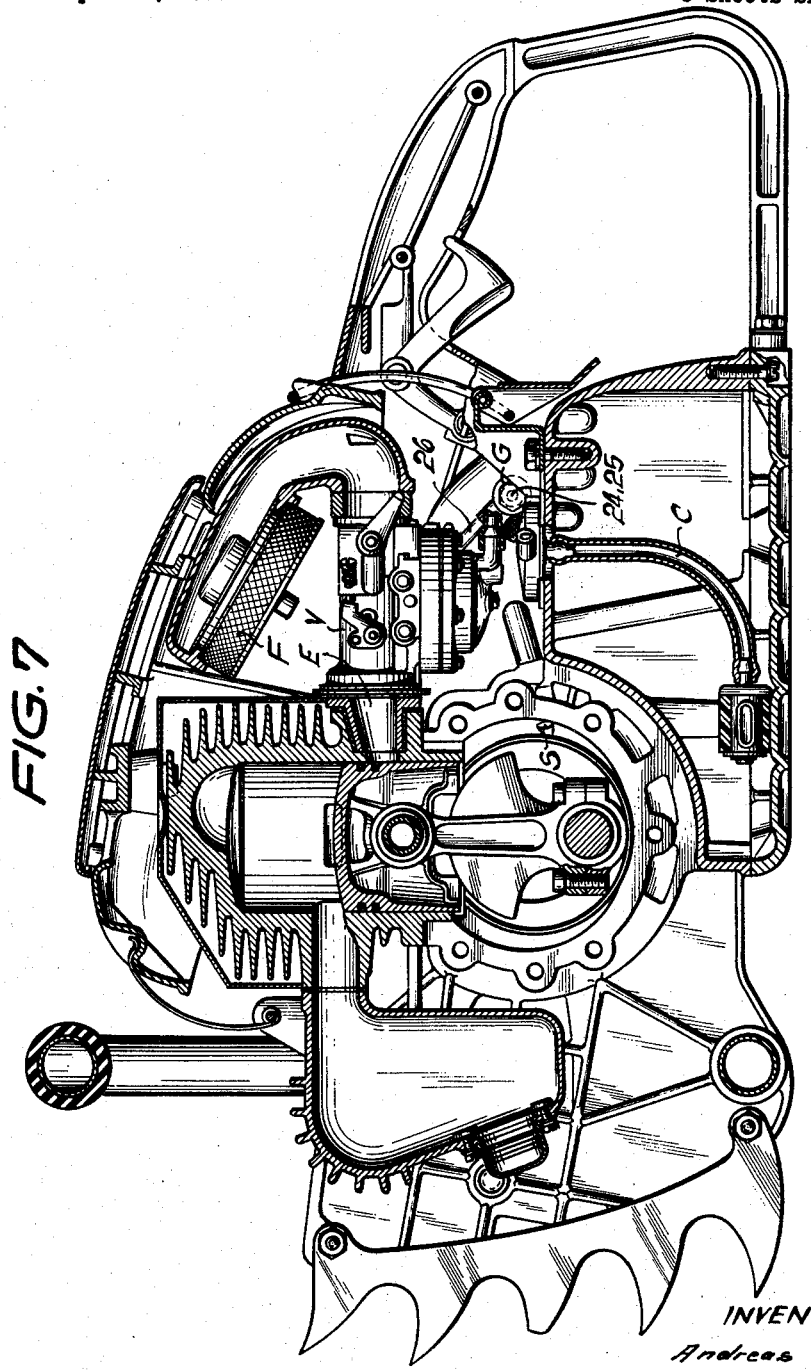

United States Patent Office 3,068,961
Patented Dec. 18, 1962

3,068,961
AUTOMATICALLY OPERABLE LUBRICATING PUMP, ESPECIALLY FOR MOTOR CHAIN SAWS
Andreas Stihl, Neustadt, near Waiblingen, and Hermann Hase, Stuttgart-Bad Canstatt, Germany; said Hermann Hase assignor to Andreas Stihl
Filed Sept. 18, 1959, Ser. No. 840,850
Claims priority, application Germany Sept. 19, 1958
7 Claims. (Cl. 184—29)

The present invention relates to a motor chain saw and, more specifically, to a motor chain saw which passes over a guiding rail and is driven directly by a motor, i.e. without the intervention of a transmission.

With motor chain saws having no transmission between the motor and the chain saw, the space between the motor and the chain driving sprocket is so small that oil pumps as they are employed with motor driven chain saws comprising a transmission cannot be used. Such lubricating means, as the oil pumps just mentioned, provided the highly stressed chain links of the saw chain in a continuous manner with oil so that the chain links as well as the connecting elements thereof, such as chain bolts, are protected as far as possible against an early wear.

In view of the above it was therefore necessary that motor chain saws lacking a transmission between the motor and the chain saw had to be designed without automatic lubrication. Instead of an automatic lubrication, these transmissionless motor chain saws had to be lubricated by manually operable lubricating devices, such as a pressure lever actuated lubricating device.

However, manually operable lubricating devices do not assure a sufficient lubrication, because the regular operation of the lubricating device by the operator of the chain saw is frequently forgotten. On the other hand, as mentioned above, transmissionless chain saws cannot be provided without considerable costs with a lubricating device which is driven by the driving motor in a positive or power interlocked manner. Consequently, heretofore known transmissionless motor chain saws were not provided with an automatic lubricating device driven by the crankshaft or a shaft operatively connected thereto of the motor.

It is, therefore, an object of the present invention to provide a transmissionless motor chain saw with automatically operable lubricating device which will not require a change in the dimensions of the driving elements of the chain saw.

It is another object of this invention to provide a transmissionless motor driven chain saw with an automatically operable lubricating device which can be mounted at any desired point of the chain saw without the necessity of connecting the lubricating device directly to rotating elements of the chain saw.

These and other objects and advantages of the invention will appear more clearly from the following specification in connection with the accompanying drawings, in which:

FIG. 1 represents on an enlarged scale a section through a lubricating device according to the invention, said section being taken in a direction perpendicular to the plane of the diaphragm forming part of said lubricating device and perpendicular to the axis of the feeding piston.

FIG. 2 is a section along the line II—II of FIG. 1.

FIG. 2a is a section along the line IIa—IIa of FIG. 2.

FIG. 3 is a top view of the closed housing of the automatic lubricating device according to the invention.

FIG. 4 is a view upon the motor block of the motor chain saw in the direction of the crankshaft as indicated by the arrow IV of FIG. 6.

FIG. 5 is a side view seen in the direction of the arrow V of FIG. 6, the housing cap closing the delivery pump of the invention toward the outside being removed so that the location of the oil pump with intake connection in the motor block of the motor chain saw will be visible.

FIG. 6 is a top view of the motor chain saw with the oil supply to the guiding rail of the chain saw shown partially in section.

FIG. 6a is a section on a somewhat enlarged scale as taken along the line VIa—VIa of FIG. 6.

FIG. 7 is a complete section through the motor housing of the motor chain saw.

Figure 8:
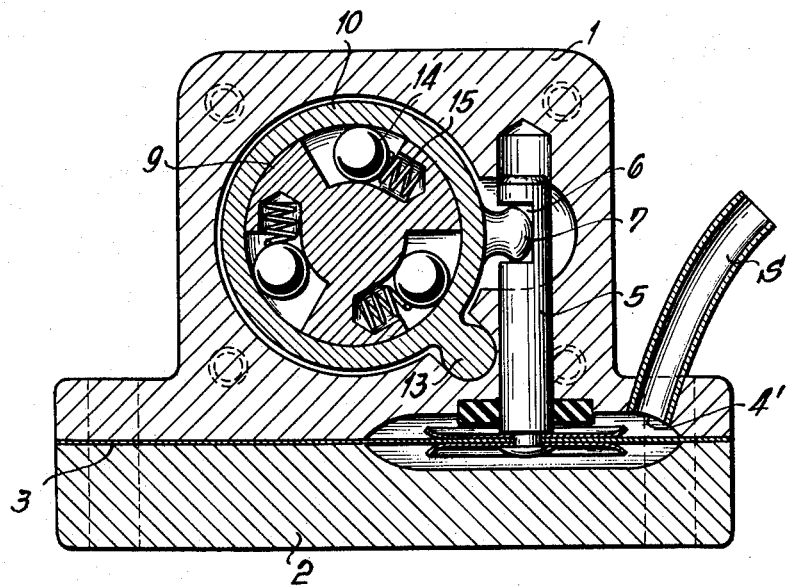
FIG. 8 is a section through a lubricating device or pump arrangement somewhat modified over that of FIG. 1.

According to the present invention, a transmissionless chain saw is provided with an automatic lubricating device without requiring changes in the dimensions of the chain saw. This is brought about in conformity with the present invention by operating the lubricating device by sub-atmospheric pressure produced by the motor. The arrangement of a lubricating device driven in this manner has the advantage that it can be mounted wherever desired without the necessity of directly connecting the lubricating device to rotating elements.

The automatically operable lubricating device according to the invention is provided with a diaphragm one side of which is exposed to the sub-atmospheric pressure in the crankcase chamber of the motor. In this way, the pressure variations in the crankcase are conveyed to said diaphragm which in conformity with these variations, i.e. in conformity with the working rhythm of the motor, will carry out oscillating movements. In further conformity with the present invention, these oscillating movements of the diaphragm will be conveyed to a feeding piston communicating with oil feeding and discharge conduits. A particularly simple arrangement of this character is obtained by connecting a pin or the like to said diaphragm and connecting said pin with means to convert the reciprocating movement of the diaphragm into rotative movements of the feeding piston. Thus, for instance, these means may consist of a free wheel locking mechanism, the reciprocating element of which is operatively connected through the intervention of rolling elements with the push rod of the pump in such a way that the push rod is actuated in a direction of rotation in conformity with the strokes of the diaphragm pin. If the rotatably journalled push rod of the pump is by means of a cam surface guided in the housing for upward and downward movement, in addition to the rotative movement of the feeding piston, a stroke movement is obtained in such a way that a sufficient suction-pressure movement will be produced to create a feeding flow of the oil. The transmission ratio between the reciprocating movements of the diaphragm pin and the rotation of the feeding piston, i.e. of a feeding stroke, can be selected in any desired manner. Furthermore, for adjusting the oil delivery, a separate adjusting mechanism may be provided which limits preferably the stroke of the feeding piston.

Referring now to the drawings in detail, the lubricating device according to the present invention comprises a two-part housing 1, 2 in which the oil pump is mounted. Arranged between the two housing parts 1 and 2 is a substantially flat diaphragm 3 which is clamped therebetween in taut condition by clamping the housing parts 1 and 2 together. One side of the diaphragm communicates through a conduit 4 with the sub-atmospheric pressure chamber of the motor of the chain saw, preferably with the interior of the crankcase. The double arrow F1 symbolizes the pressure variations conveyed from the crankcase through conduit 4 upon one side of the diaphragm. Due to the low pressure in the crankcase, the diaphragm is moved out of its flat position and thus actuates in corresponding direction a diaphragm pin 5 connected to the diaphragm 3. When said low pressure subsides, the diaphragm 3 will move in opposite direction. Pin 5 will thus carry out a reciprocating movement symbolized by the double arrow F2 in conformity with the rhythm of the pressure variations in the crankcase. The said pin 5 is positively connected to a free wheel locking mechanism, generally designated L, which actuates the feeding piston 9 in one direction of rotation. To this end, pin 5 is provided with a recess or cutout 6 engaged by a stud 7 of a ring 8 (FIGS. 1 and 2). The free wheel locking mechanism L connected to the feeding piston 9 comprises, according to the particular showing in the drawing, two superimposed and coaxially arranged rings 8 and 10 which rest on a plate 11 held in its position relative to the feeding piston 9 by means of a spring ring 12. Ring 10 of the free wheel locking mechanism is stationarily mounted in housing part 1 by means of a stud 13 (FIG. 1). Thus, ring 10 cannot follow the rotative movements of ring 8. Ring 10 forms the support for the rotative movement of the feeding piston 9 which, due to the roller bodies 14 arranged between said rings 8 and 10 and feeding piston 9, can rotate in one direction only. The roller bodies 14, which rest on one hand on the outer surface of the feeding piston 9 and on the other hand on the inner surface of rings 8 and 10, are continuously acted upon by springs 15 urging the same to move in one direction and thus allow the feeding piston 9 to rotate in the direction of the arrow F3 only (FIG. 1). In the opposite direction of rotation, the roller bodies 14 are clamped fast in such a way that the feeding piston 9 cannot follow the backward movement of the upper ring 8. Thus, as mentioned above, the feeding piston 9 can move only in the direction of rotation of the arrow F3.

The lower end of feeding piston 9 is by means of a pin 16 and a groove 17 guided in such a way that simultaneously with its rotative movement the feeding piston 9 will carry out a stroke-like upward and downward movement in conformity with the contour or inclination of groove 17. The upper end of the feeding piston 9 is provided with a cutout or face 18 arranged within the range of the oil inlet conduit 19. Thus, the oil will pass through the oil inlet conduit 19 onto the cutout or face 18 and by means of the stroke of the feeding piston 9 in cooperation with the rotative movement thereof will be fed to the discharge conduit 20. Inasmuch as the diaphragm is acted upon by the low pressure in the crank-case in conformity with the working stroke of the high speed motor, it will be evident that at a properly selected transmission ratio between the stroke of the diaphragm pin 5 and the rotative movement of ring 8, a continuous flow of oil will be entertained from conduit 19 to conduit 20 and from there to the individual chain links of the saw chain.

The lubricating device according to the present invention may also be provided with a stroke adjusting device for adjusting the stroke of the feeding piston 9. Such a device will be described below in connection with FIGS. 4 to 7.

With regard to FIG. 4, this FIGURE shows the crankcase connection S which leads to pipe 4 of the delivery pump (FIGS. 1 and 2). FIG. 4, and more specifically, FIG. 8 shows a modified pump arrangement wherein the entrance opening, which is connected to the crank-case, is designated with the numeral 4' (also see FIG. 6). In this arrangement said entrance opening is in contrast to conduit 4 of FIG. 1 not centrally directed to the diaphragm center but is located eccentrically thereto.

A further difference between the arrangement of the pump, FIGS. 4 to 6, and 8, on one hand and the arrangement of FIGS. 1 and 2 on the other hand consists in that said inlet passage 4' is directed to the opposite side of diaphragm 3. In other words, with the arrangement of FIGS. 4 to 6, and 8, the pressure conveyed from the crankcase is directed to that side of the diaphragm on which the push rod 5 is located. The other side of the diaphragm is not acted upon by pressure. Thus, the arrangement is the reverse of the arrangement shown in FIGS. 1 and 2. However, the principle of the invention namely the periodic variations of pressure on one of the two sides of the diaphragm is the same. The two pumps can be interchangeably used with all of the other structure illustrated being unchanged and being designated with the same reference numerals.

It will be appreciated that the movement of the diaphragm of the pump will actuate push rod 5 and, as described in connection with FIGS. 1 and 2 will withdraw oil from the oil sump. In FIG. 5, the oil intake line is designated with the numeral 22, whereas the oil intake funnel is designated with the numeral 23. The arrow in FIG. 5 indicates the direction of flow of the drawn-in oil. The oil flows upwardly to the oil pump and (see FIG. 2) passes into passage 19 into the cutout 18 and from there into the oil discharge or supply passage 20. In FIG. 5, the oil inlet is designated with the reference numeral 19', and in FIG. 6 the oil discharge line is designated with the numeral 20'. Detachably connected to passage 20' by means of a screw 24 is a pipe connecting nipple 25 of the oil discharge line 26. Pipe 26 leads to the counter nipple 27 which connects the oil line 26 with the oil bore 28. The bore 28 leads into the enlarged chamber 29 through which the oil passes to bore 30 and from there to groove 31 of the guiding rail 32 for the chain saw. It is in groove 31 where the individual chain links slide, the lower part of which picks up the oil and is thus lubricated. The chamber 29 is designed as a slot extending in a direction parallel to the axis of the chain guiding rail 32 because said rail 32 must be axially displaceable in conformity with the length of the saw chain so that the entrance opening 30 will always be located within the slot-shaped feeding chamber 29 even if the guiding rail 32 is axially displaced.

The adjustment of the stroke of the diaphragm will best be evident from FIG. 6 but it is to be understood that it also applies to the embodiment of FIGS. 1 and 2. The said stroke adjustment is effected in a simple manner by an abutment 34 which is axially adjustable in a direction perpendicular to the diaphragm and which can be adjusted as to height along the threaded bolt 35 by means of an adjusting nut 36. The closer the abutment 34 will be located with regard to diaphragm 2', the shorter will be the stroke of the diaphragm and the smaller will be the delivered quantity of the oil. Nevertheless, the quantity of oil delivered by the pump will be dependent on the speed of the motor. This is a particular advantage of the present invention because at higher speed of the motor, i.e. higher speed of the chain saw, a greater quantity of lubricating oil will be fed to the chain saw.

FIG. 7 shows a complete section through the motor housing of the motor chain saw. In this figure, V indicates the carburetor with the air filter F. The intake connection for the gasoline-air mixture into the crankcase is designated with the reference character E, whereas the character C designates the feeding line for the fuel to the carburetor. G designates the connection of the oil pump (not shown in FIG. 7) to the crankcase. The pressure of the crankcase is conveyed through conduit S, S' to the diaphragm of the feeding pump. The line S, S' in FIG. 7 thus corresponds to passage 4 of FIG. 2.

As will be evident from the above, the arrangement and design of the lubricating device according to the present invention is extremely simple and is independent of the driving elements proper of the motor chain saw. Moreover, the installation of the lubricating device according to the present invention does not require any structural changes in the driving elements.

It is, of course, to be understood that the present invention is, by no means, limited to the particular constructions shown in the drawings but also comprises any modifications within the scope of the appended claims. Thus, while in the hereinbefore described embodiment the diaphragm 3 has been described as being exposed to a sub-atmospheric pressure, e.g. in the crankcase of the internal combustion chamber, it is, of course, also possible instead to expose the said diaphragm to a pressure higher than atmospheric pressure as for instance the compression pressure periodically created in the engine.

What we claim is:

1. In an automatically operable lubricating pump for a chain saw directly driven by a one cylinder engine having a crankcase and periodically creating a pressure condition in said crankcase: a pump cylinder having inlet and outlet means for receiving and discharging lubricant, plunger means rotatably mounted in said cylinder for controlling said inlet and outlet means and reciprocable in said cylinder for pumping fluid from the inlet means to the outlet means, diaphragm means having one side thereof connected with said crankcase so as to expose said one side of said diaphragm to said periodically created pressure condition in said crankcase for actuation thereby, reciprocable means connected to said diaphragm means for reciprocation, one-way clutch means interposed between and operatively connected to said reciprocable means and said plunger means, and means associated with said plunger for causing reciprocation thereof in timed relation to the rotation thereof.

2. In an automatically operable lubricating pump for chain saws with a directly engine driven saw: a one cylinder, two stroke cycle engine having a crankcase into which a fuel-air mixture is drawn on the compression stroke of the engine and from which the mixture is expelled on the working stroke of the engine, a diaphragm, conduit means communicating with one side of said diaphragm and connected with the crankcase of the engine for exposing said one side of said diaphragm to the pressure variations in said crankcase to thereby impart vibratory strokes upon said diaphragm in conformity with the pressure variations in said crankcase, a pump cylinder having an inlet opening and an outlet opening, a pump piston rotatably mounted in said cylinder for controlling said openings and reciprocable in said cylinder for controlling the passage of lubricant from said inlet opening to said outlet opening, supply conduit means adapted to be connected to a lubricant supply source and communicating with said inlet opening for conveying lubricant into said cylinder, discharge conduit means communicating with said outlet opening for conveying lubricant to elements to be lubricated, reciprocable pin means connected to a side of said diaphragm for reciprocation thereby in conformity with the strokes of said diaphragm, and free wheel means interposed between and operatively connected to said pin means and said pump piston, said free wheel means including oscillatable means operable by said pin means and also including roller means operatively connecting said oscillatable means with said pump piston so as to allow said piston to move forward in response to the movement of said oscillatable means in one direction only, and means engaging the piston to cause reciprocation thereof in response to rotation thereof and in timed relation to said rotation.

3. An arrangement according to claim 2, in which the free wheel means comprises two coaxial rings arranged one adjacent the other, one of said rings being mounted stationarily and the other one of said rings being connected to said pin means for oscillation thereby, and a set of spring-urged roller means interposed between each of the two rings and said pump piston.

4. In an automatically operable lubricating pump for chain saws with a directly engine driven saw: a one cylinder, two stroke cycle engine having a crankcase into which a fuel-air mixture is drawn on the compression stroke of the engine and from which the mixture is expelled on the working stroke of the engine, a housing, a diaphragm mounted in said housing and connected with the crankcase of the engine for exposing said one side of said diaphragm to the pressure variations in said crankcase to thereby impart vibratory strokes upon said diaphragm in conformity with the pressure variations in said crankcase, a pump cylinder having an inlet opening and an outlet opening, a pump piston reciprocably and rotatably mounted in said cylinder for controlling said openings and said passage of lubricant from said inlet opening to said outlet opening, cam means connected to said pump piston, means on the housing engaging said cam means for producing a longitudinal movement of said pump piston in response to a rotation thereof, supply conduit means adapted to be connected to a lubricant supply source and communicating with said inlet opening for conveying lubricant into said cylinder, discharge conduit means communicating with said outlet opening for conveying lubricant to the saw chain to be lubricated, reciprocable pin means connected to said diaphragm for reciprocation thereby in conformity with the strokes of said diaphragm, and free wheel means including oscillatable means connected to and operable by said pin means and also including roller means operatively connecting said oscillatable means with said pump piston so as to allow said piston to rotate in response to the movement of said oscillatable means in one direction only, the connection of said oscillatable means to said pin means permitting movement of said oscillatable means in the direction of reciprocation of said piston.

5. An arrangement according to claim 4, in which said cam means is arranged at the end of said pump piston opposite the end thereof that controls said inlet and outlet openings.

6. In an automatically operable lubricating pump for a chain saw directly driven by an engine: a one cylinder, two stroke cycle engine having a crankcase into which a fuel-air mixture is drawn on the compression stroke of the engine and from which the mixture is expelled on the working stroke of the engine, a pump cylinder having inlet and outlet means for receiving and discharging lubricant, plunger means rotatably mounted in said cylinder for controlling said inlet and outlet means, one end of said plunger means being adjacent said inlet and outlet means and having a cutout within the range of said inlet and outlet means, diaphragm means having one side thereof connected with said crankcase so as to expose said diaphragm to said periodically created pressure condition in said crankcase for actuation thereby, reciprocable means connected to said diaphragm means for reciprocation thereby, one-way clutch means interposed between and operatively connected to said reciprocable means and said plunger means, means for causing reciprocation of said plunger means in response to and in timed relation to the rotation thereof, and said plunger means being operable in response to said reciprocation to draw lubricant into said cylinder and to discharge it therefrom.

7. An arrangement according to claim 4, which includes means adjacent one end of said piston for adjusting the feeding stroke thereof.

References Cited in the file of this patent

UNITED STATES PATENTS

| 796,659 | Kipp | Aug. 8, 1905 |
| 1,719,613 | Kohler | July 2, 1929 |
| 1,985,406 | Galkin | Dec. 25, 1934 |
| 2,987,256 | Johnson et al. | Jan. 8, 1935 |

FOREIGN PATENTS

| 13,768 | Great Britain | of 1915 |
| 117,758 | Austria | May 26, 1930 |
| 871,334 | France | Jan. 15, 1942 |